US008086628B2

(12) United States Patent
Allen et al.

(10) Patent No.: US 8,086,628 B2
(45) Date of Patent: Dec. 27, 2011

(54) SYSTEMS AND METHODS FOR USER-CONSTRUCTED HIERARCHICAL INTEREST PROFILES AND INFORMATION RETRIEVAL USING SAME

(75) Inventors: Richard B. Allen, Lago Vista, TX (US); Thomas A. Bellwood, Austin, TX (US); Robert B. Chumbley, Austin, TX (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/539,646

(22) Filed: Aug. 12, 2009

(65) Prior Publication Data

US 2009/0307216 A1    Dec. 10, 2009

Related U.S. Application Data

(63) Continuation of application No. 12/138,054, filed on Jun. 12, 2008, now abandoned, which is a continuation of application No. 10/798,937, filed on Mar. 11, 2004, now Pat. No. 7,426,508.

(51) Int. Cl.
*G06F 13/30* (2006.01)
(52) U.S. Cl. ....................................................... 707/770
(58) Field of Classification Search ................... 707/770
See application file for complete search history.

(56) References Cited

U.S. PATENT DOCUMENTS

| | | | |
|---|---|---|---|
| 6,584,466 B1 | 6/2003 | Serbinis et al. | |
| 6,606,659 B1 | 8/2003 | Hegli et al. | |
| 7,117,207 B1 | 10/2006 | Kerschberg et al. | |
| 2004/0030686 A1 | 2/2004 | Cardno et al. | |
| 2005/0203884 A1 | 9/2005 | Allen et al. | |
| 2006/0004732 A1 | 1/2006 | Odom | |
| 2006/0059138 A1 | 3/2006 | Milic-Frayling et al. | |

*Primary Examiner* — Hung Q Pham
(74) *Attorney, Agent, or Firm* — Yee & Associates, P.C.; Jeffrey S. LaBaw (57) ABSTRACT

Systems and methods for delivering Web content are provided. The systems and methods include a mechanism for providing interest data that may be applied to filter Web content at the provider side. A hierarchical data set of user-identified interests in received from the user's Web client. The hierarchical data set is parsed, and responsive thereto, one or more keyword attribute values are extracted from the hierarchical data set. The extracted keyword values are applied to filter content for delivery to a requesting Web client.

20 Claims, 6 Drawing Sheets

SYSTEMS AND METHODS FOR USER-CONSTRUCTED HIERARCHICAL INTEREST PROFILES AND INFORMATION RETRIEVAL USING SAME

This application is a continuation of application Ser. No. 12/138,054, filed Jun. 12, 2008, status allowed, which in turn is a continuation of application Ser. No. 10/798,937, filed Mar. 11, 2004, status issued on Sep. 16, 2008, as U.S. Pat No. 7,426,508.

TECHNICAL FIELD

The present invention relates to data processing systems, and in particular data processing systems for obtaining Web content in which the user may generate and provide a specialized or customized interest profile that may be applied to selectively filter the content provided to the user.

BACKGROUND INFORMATION

The World Wide Web (or simply, the "Web") has become a readily available and extensive source of information and other resources to users of personal computers and workstations. Indeed, the explosive growth of the Web and the volume of information available, has complicated the user's task of locating the desired information. The user must spend increasing amounts of time performing keyword-based searches on one or more of the search engines available on the Web, or traversing links via portal sites in search of the information the user seeks. Additionally, search engine and portal providers commonly have only limited information which they use to present first-order search results, or top-level navigation links, respectively. Often, the limited information may be restricted to the simple keywords provided to the search. At best, a site might provide for site-specific personalization/preferences settings. Once created, these preferences are only available at that site. Moreover, these preference settings may not capture the full range of interests of the user. Thus, users must still perform manual filtering through search results or navigate through layers of content.

As a practical matter, it is difficult for a site to foresee, at a sufficiently granular level, the potential interests of its individual users. Although a provider can ask about preferences or interests, it cannot anticipate the essentially unlimited range of interests a user might have. Moreover, it is impractical for a provider to save and manage such data for each of its users.

Consequently, there is a need in the art for systems and methods that may be used by an individual to describe his or her interests, and that can then be used by a portal or search engine to customize portal links or automatically refine searches based on the user's personalized interests.

SUMMARY

The aforementioned needs are addressed by the present invention. Accordingly, there is provided a method of delivering Web content. The method includes receiving a hierarchical data set of user-identified interests. The hierarchical data set is parsed, and responsive thereto, one or more keyword attribute values are extracted from the hierarchical data set. The extracted keyword values are applied to filter content for delivery to a requesting Web client.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following description taken in conjunction with the accompanying drawings, in which:

FIGS. 2A and 2B illustrate.

DETAILED DESCRIPTION

In the following description, numerous specific details are set forth to provide a thorough understanding of the present invention. For example, particular messaging protocols may be referred to, however, it would be recognized by those of ordinary skill in the art that the present invention may be practiced without such specific details, and in other instances, well-known circuits have been shown in block diagram form, in order not to obscure the present invention in unnecessary detail. Refer now to the drawings wherein depicted elements are not necessarily shown to scale and wherein like or similar elements are designated by the same reference numeral through the several views.

Figure 1:
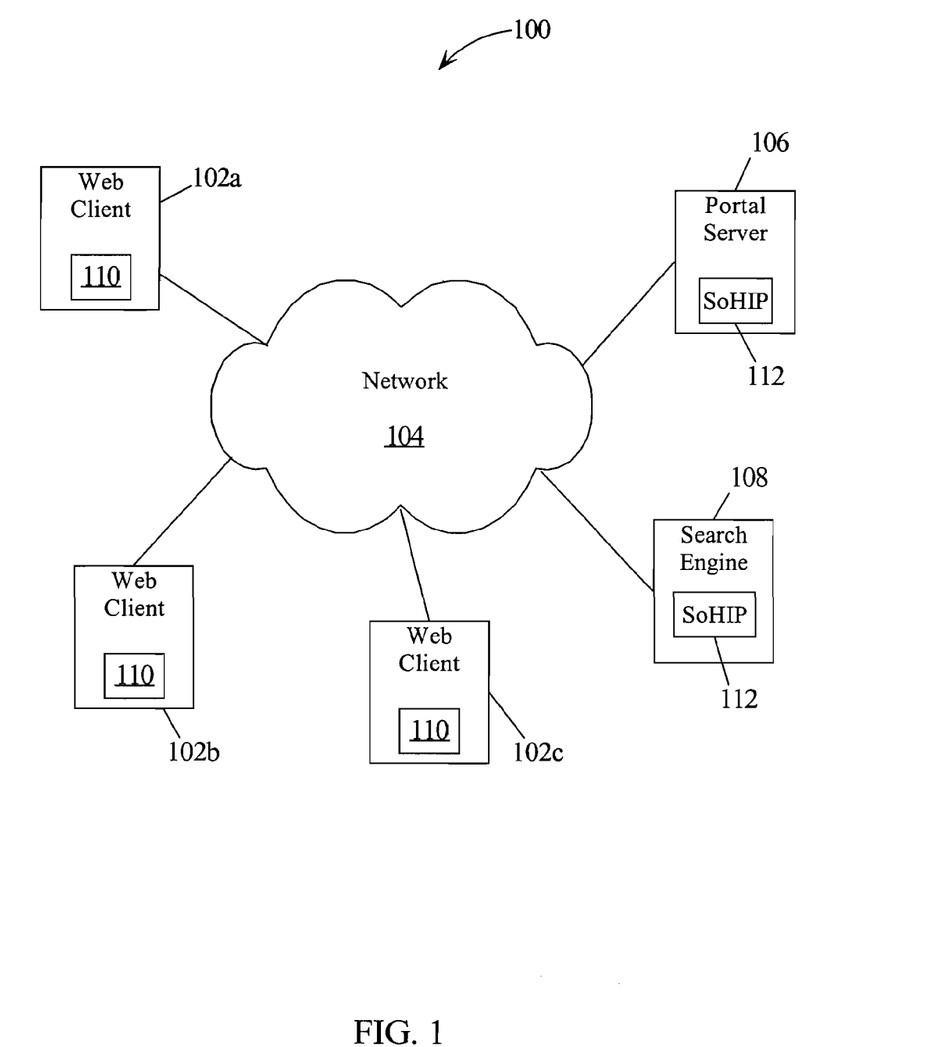
FIG. 1 illustrates a network architecture in accordance with an embodiment of the present invention.

FIG. 1 schematically illustrates an architecture 100 which may be used in conjunction with the present inventive principles to provide for user-constructed hierarchical interest profiles and information retrieval. A plurality of network-connected Web clients 102*a-c* provide user access to Web resources using a Web browser or other Web transport protocol based application (for example, file transport via FTP, etc.). Web clients 102*a-c* may connect to Web resources via network 104, which may include the "network of networks" commonly-known as the Internet. Web resources may be represented in the architecture 100 by portal server 106 and search engine 108 which provide "gateways" to a plethora of Web content including applications, games, documents etc. Typically, a portal provides links to Web content organized in a topical structure, often represented in hierarchical fashion, such as tree. Additionally, the portal may include a search service that permits the user to search the portal site for links to Web content based upon user input keywords. Search engines typically present the user with a simple form-based Web page which permits the user to enter one or more search terms descriptive of the Web content that the user is seeking. As previously described, a Web portal or search engine may provide search results that require substantial manual filtering by the user to extract the desired information from all of the returned "hits." Conversely, the user may attempt to narrow the search, by specifying additional search terms, however, this increases the likelihood that some Web content of interest may be missed. To provide additional information to a Web portal or search engine which may be used to filter search results or portal links, Web clients 102a-c include sets of hierarchical interest points 110 (denoted, for notational convenience "SoHIP") in accordance with the present inventive principles, and described further hereinbelow. These may be generated by the user and stored as a cookie value or other persistent data forms. This may be provided to a SoHIP parser 112 equipped portal server or search engine which may use the user's interest points obtained therefrom to filter search results before presenting them to the user, or filter portal links to reduce the number of portal links the user traverses.

Figure 2A:
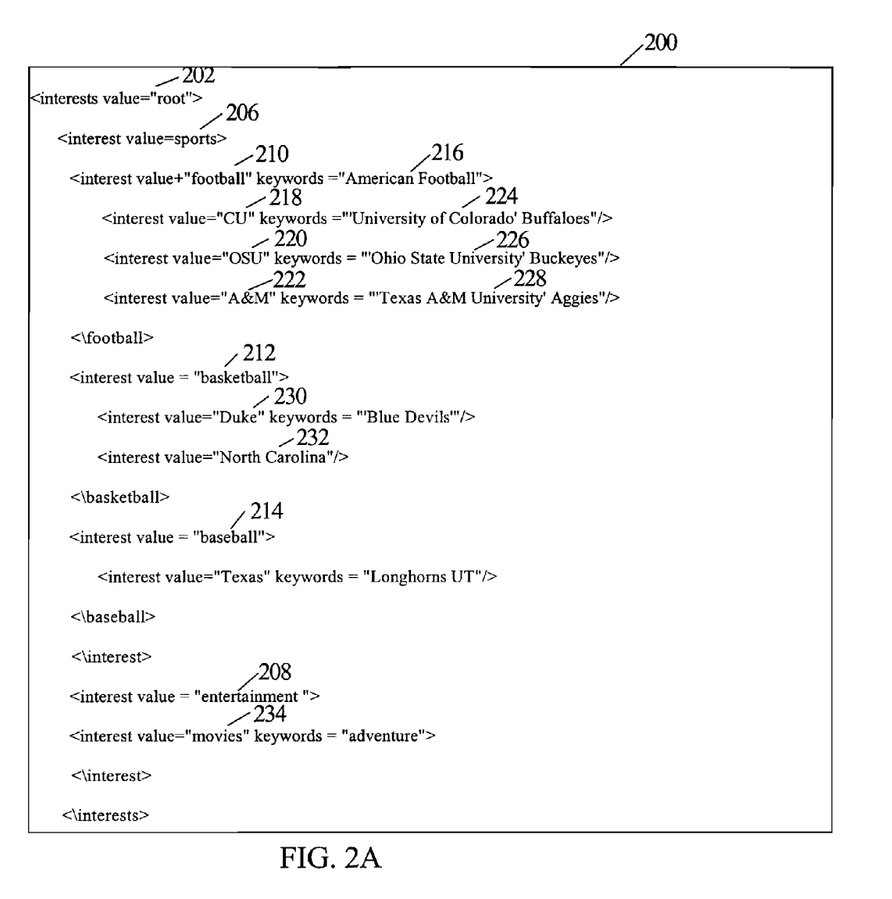
FIG. 2A illustrates an exemplary hierarchical interest profile represented in XML in accordance with an embodiment of the present invention.
Figure 2B:
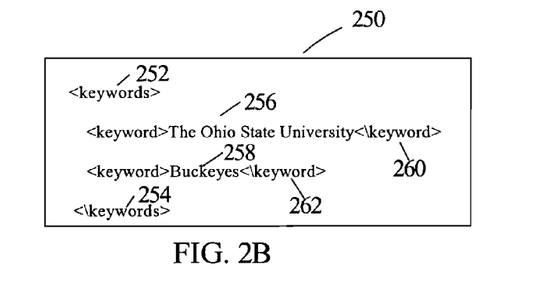

As noted hereinabove, a user may, in accordance with the present inventive principles, generate a set of hierarchical interest points, or SoHIP that may be used by a search engine or Web portal to refine the user's searches for Web content. A SoHIP is a hierarchical organization of interest metadata. The hierarchy captures the user's preference for how their interest data is to be organized and/or categorized. As one traverses the user's SoHIP data, from root to leaf nodes, each level of the tree represents a user specific grouping of interests at increasing levels of granularity. The hierarchical representation can be used by content providers to construct and organize content that best matches the user's specific interests, at various levels of granularity. A graphical user interface mechanism for generating and maintaining SoHIP will be discussed below. One representation of a SoHIP that may be advantageously used is as an XML (Xtensible Markup Language) document. (XML is a tag-based markup language for describing structured data. XML standards are promulgated by the World Wide Web Consortium (W3C),) FIG. 2A illustrates a SoHIP example 200 represented in XML. The XML tags <interests> (202) and <\interests> (204) wrap a set of user-defined interest keyword value pairs. Tag 202 represents the root node in the hierarchy, and has the value "root." Each interest represents a node in the SoHIP hierarchy, and define a nested set of user-specified interest elements (or, simply, "interests"), represented by the associated value. Thus, in SoHIP 200, the "toplevel" interests include "sports" (206) and "entertainment" (208). Continuing down the hierarchy, interest nodes further refine the user's interests within each of the toplevel interests. Within the sports interest, three interests are defined: "football" 210, "basketball" 212 and "baseball" 214. Keyword attributes provide a mechanism for the user to specify terminology that may be used to describe the particular interest. Thus, the user's interest "football" 210 may, alternatively be described as "American football," keywords 216. In SoHIP 200, the user's interest in football is further refined by the three interest nodes 218, 220 and 222, having the values "CU," "OSU," and "A&M," respectively. Keywords 224 associate the terminology "'University of Colorado'" and "Buffaloes" with interest 218. Similarly, keywords 226 with the keyword values "'The Ohio State University'" and "Buckeyes," and keywords 228, with the values "'Texas A&M University'" and "Aggies" are associated with interest nodes 218 and 220, respectively. Note that in SoHIP 200, spaces are used as a list separator for keyword attribute value lists. Additionally single quotes are used as enclosing characters to set off a phrase used as a single keyword value. These notational schemes are illustrative, and other conventions may be used. The particular notational scheme used does not implicate the present inventive principles, and would fall within the spirit and scope of the present invention. The granularity within "basketball" interest 212, is further refined by interest node 230 with the value "Duke" and interest node 232 with the value "North Carolina," and the toplevel interest "entertainment" 208 is further refined by interest node 234 having the value "movies." Each level in the hierarchy is enclosed by an end tag denoted using the "backslash" character in accordance with the XML specification. These illustrations comply with the rules for well-formed XML, including the multiple forms allowable for the treatment of end-tags:

FIG. 2B illustrates an example of an alternative keyword structure 250 that may be used in an alternative embodiment of SoHIP 200. In keyword structure 250, keywords have been "promoted" to node elements, and a container tag pair <keywords> (252) and <\keywords> (254) to delimit sets of keyword nodes are defined. In the exemplary structure 250, the values of keywords 226, FIG. 2A are each represented by a <keyword> node and the corresponding end tag; node 256 contains the keyword "The Ohio State University," and <keyword> node 258 contains the keyword "Buckeyes." Note that the entire text delimited by the <keyword> <\keyword> tag pair represents the keyword so defined, and keyword phrases are not set off by enclosing characters, such as single quotes. Thus end tag 260 terminates keyword node 256 and end tag 262 terminates keyword node 258.

Additionally, as would be recognized by those of ordinary skill in the relevant art, in accordance with the XML standards, the XML document may include default language (i.e. English, French, Spanish etc.) encoding in the document header. Additional attributes may be developed to override default language with respect to particular keywords. In other words, a "language" attribute may be provided to specify the language associated with a particular keyword having the language attribute. Additionally, as previously noted, the XML-based SoHIP representations in FIGS. 2A and 2B are exemplary, and alternative implementations may omit the topmost wrapper element, "interests." Also, an implementation may omit the value "root" in the outermost element node. Such implementation alternatives may be specified in either an XML DTD (data type dictionary) or in an XML schema file. Note that XML parsers in accordance with the XML specification should accommodate such alternative implementations of an XML-based SoHIP representation.

Figure 3:
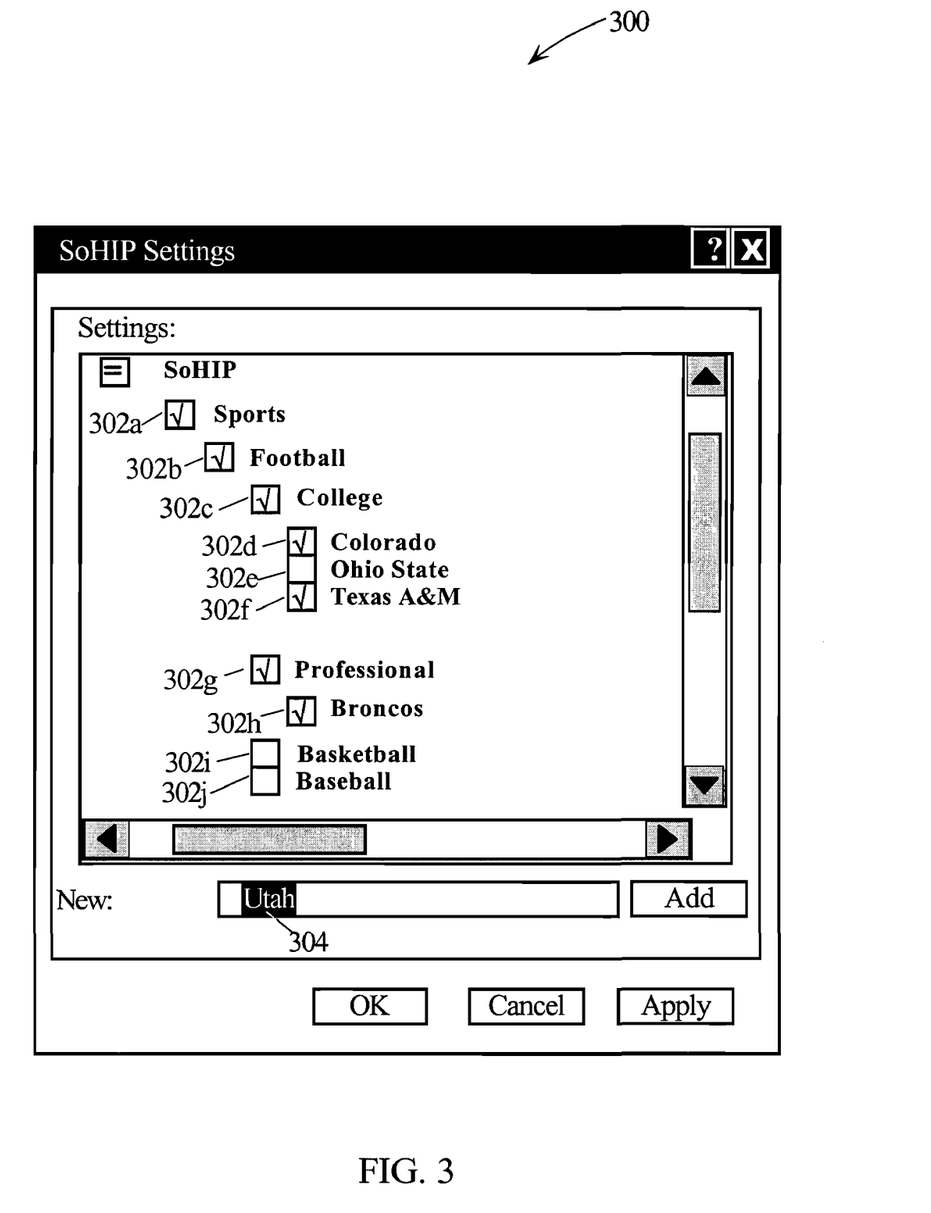
FIG. 3 illustrates a graphical user interface GUI for managing hierarchical interest data that may be used in conjunction with the present invention.

In accordance with the present invention, a graphical user interface (GUI) may be provided to manage a user's SoHIP data. An exemplary GUI 300 corresponding to the SoHIP data of FIGS. 2A and 2B is illustrated in FIG. 3. GUI 300 is in the form of a dialog window familiar in GUI-based operating systems commonly found on personal computers and workstations. GUI 300 is a tree-based list. Selection and deselection of interests and subinterests are effected by the checkboxes 302a-j. Typically, checkboxes toggle in response to mouseclicks when a cursor is positioned over the checkbox. An XML document representing the data may be populated using the selections in GUI 300 and sent to a Web portal or search engine, as described further below. Thus, an XML SoHIP representation corresponding to the selections in GUI 300 would have interest nodes with the values "Sports," "Football," "College," with sub-interests "Colorado," "Texas A&M," "Professional." with sub-interest "Broncos," corresponding, respectively to selected checkboxes 302a, 302b, 302c, 302d, 302f, 302g and 302h. In this way, a search, for example, may be restricted to a subset of a user's interests, by deselecting checkboxes in the GUI tree, illustrated by checkboxes 302e, 302i, and 302j. Additionally, new interests may be added via text entry field 304.

Additionally, such GUIs may include other techniques commonly used in the data processing art to insert and modify SoHIP data. These include "drag-and-drop" manipulation of interests, and menu selections, among others. Further, inter-process communication APIs found in modern operating systems provide a mechanism by which a mouseclick or similar user input action may be employed to add a word or phrase displayed on a browser to add it to the SoHIP data "on the fly."

Although GUI 300 provides a convenient technique for managing SoHIP data, alternative mechanisms may be used to manipulate SoHIP data. These include text editors and XML editors.

Figure 4:
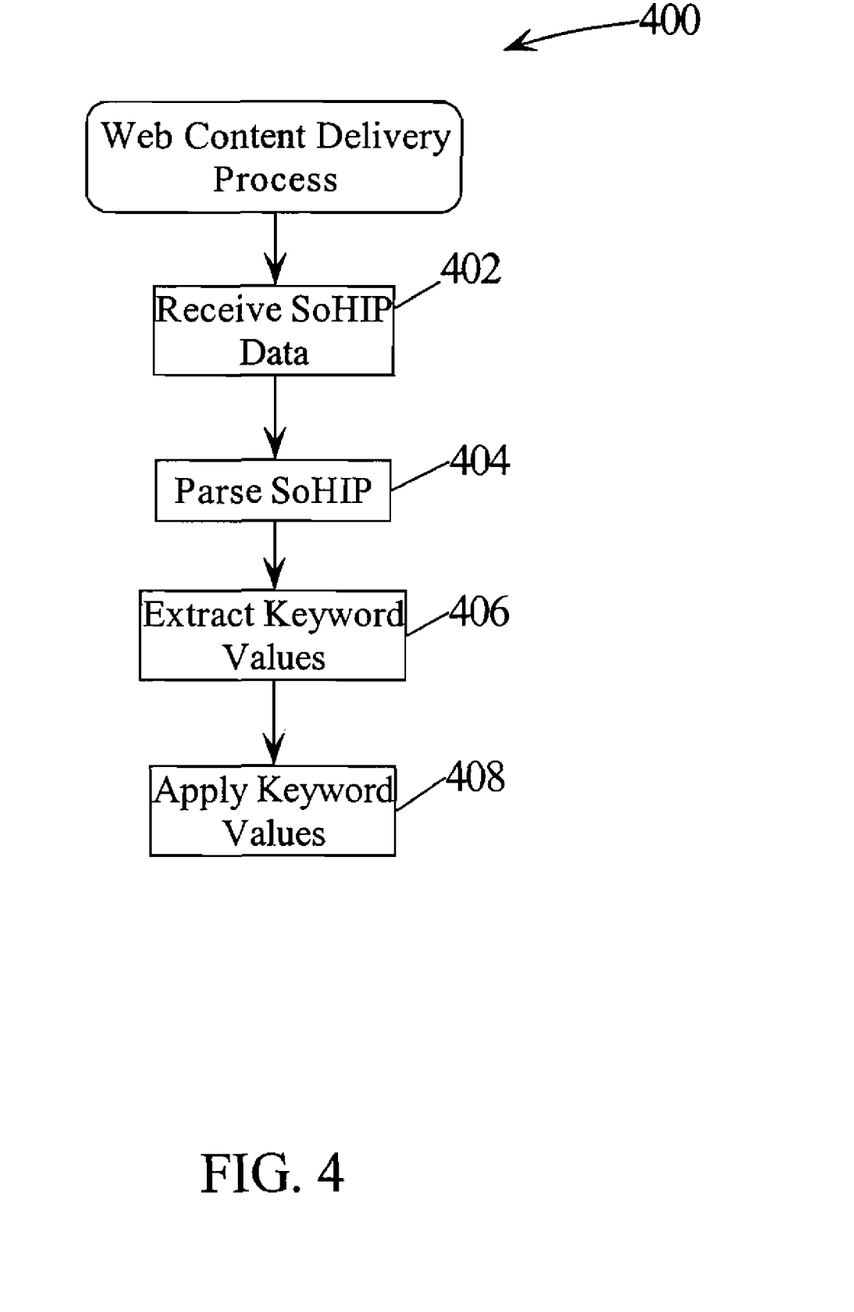
FIG. 4 illustrates, in flow chart form, a methodology for applying hierarchical interest profiles to the delivery of Web content in accordance with an embodiment of the present invention.

Refer now to FIG. 4 illustrating, in flow chart form a methodology 400 for applying SoHIP data to the delivery of Web content. Methodology 400 may be performed by a search engine or portal server, such as portal server 106 and search engine 108, FIG. 1. In step 402, SoHIP data is received from a user. A SoHIP document file such as that illustrated in FIGS. 2A, B may be transferred by several methods, and each of these may be used in an embodiment of step 402. For example, SoHIP may be stored as a cookie value, whereby the search engine or Web portal receives the SoHIP data when it retrieves the cookie. Alternatively, the user's Web browser may deliver the SoHIP data as the payload in an HTTP POST request to the Web portal server or search engine. (HTTP, the Hypertext Transfer Protocol is the message structure and port standard used to transfer information on the Web.) The Simplified Object Access Protocol (SOAP) may also be used. SOAP is a standardized, lightweight XML based protocol for exchange of information in a decentralized, distributed environment which is also promulgated under the auspices of the W3C. SOAP messages may be wrapped in a HTTP transport message. By establishing a session association between the SOAP SoHIP registration, subsequent HTTP GET request operations would automatically take the SoHIP data into account. The foregoing are session-based mechanisms. As an alternative to these, SoHIP data may be placed in a central registry, and the user's Web client could indicate to the content provider the URL of the location of the of the SoHIP data. This may be part of the URL encoding, or alternatively, provided via an HTTP POST request. The content provider, a Web portal or search engine, for example, would retrieve the data from the registry using the URL whereby the data is received in step 402.

In step 404, the SoHIP data is parsed. In an embodiment using an XML representation, an XML parser may be used. XML parser implementations are available in most modern programming languages including Java, Perl, C++, C# and Python. In step 406, the keyword values are extracted from the SoHIP data. In step 408, the keyword values are applied to the Web content request. Note that the interest value attribute may be used if no keyword attribute is explicitly provided.

Figure 5:
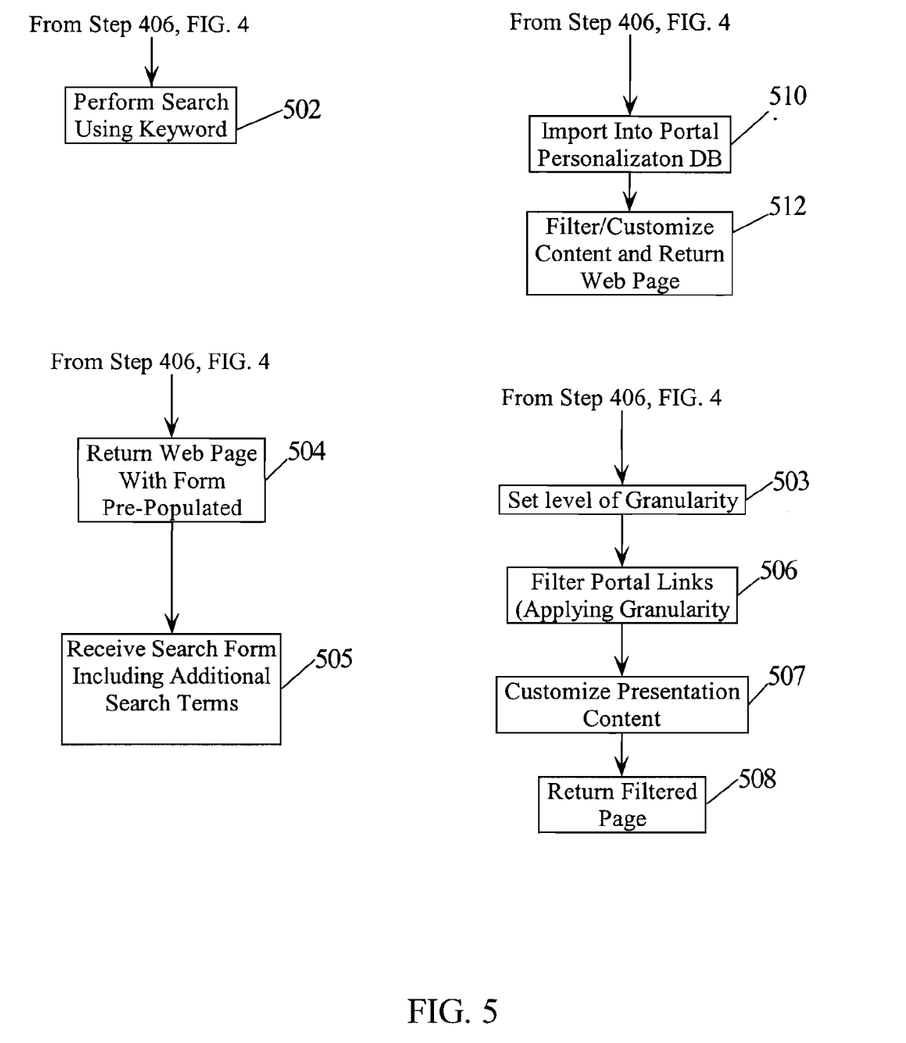
FIG. 5 illustrates alternative embodiments of the methodology of FIG. 4.

FIG. 5 illustrates application of the keywords to the delivery of Web content in accordance with alternative embodiments of the present invention. In step 502, the keywords are used as input to a search engine to perform a search for Web content containing the keywords. Such a search may be performed using a default logical combination, such as Web content containing all of the keywords (Boolean AND) or any of the keywords (Boolean OR). Alternatively, step 504, the content provider may return a Web page with a search form pre-populated with the search terms. In this way, the user may select, via a popup menu in the page, for example, whether to perform a Boolean AND search or a Boolean OR search, and submit the request back to the search engine. In step 505, the search form is received back from the user's Web client. The form may include a Boolean search value for indicating that a search on a Boolean AND of the selected search terms, or alternatively, a search on a Boolean OR of the keyword values is to be performed. Additionally, the user may prune the pre-populated search terms and/or manually add additional terms and/or further refinement of the Boolean logic operations to be used, as in a conventional search form Web page.

The SoHIP data may be used to filter and/or modify portal content. In step 505, a granularity level is set. The granularity level reflects the depth within a branch, from root to leaf, of the SoHIP tree that the Web site or portal will apply in responding to Web content request. the granularity may be set in accordance with a predetermined set of criteria, which need not be exclusive. The Web site or portal may maintain a user-selected granularity level in cookie or registry. A user may chose a level of granularity based on the form factor of the user's display, for example. In other words, the granularity may be set to provide a level of filtration that provides content that may be reasonably displayed on the user's display. Alternatively, the Web site may set a granularity level that conforms to the form factor of its Web page. In step 506, the SoHIP data is used to filter and/or modify portal content, including links, applying the SoHIP data at the level of granularity set in step 505. In step 507, the content is customized for example, adding graphics, other text, etc. associated with the interests defined in the SoHIP data, for example, put the user's team's flag(s) in the page background, with team colors for text, etc. In step 508 the filtered page is returned to the Web client browser. As previously discussed, portal sites may provide for predetermined personalization/preference settings, expanding such content based on SoHIP data. In accordance with an embodiment of the present invention, in step 510 SoHIP data may be imported into a portal's database to personalize the user's portal page. In step 512, the portal page content delivered to the user is filtered/customized using the SoHIP data stored in the portal personalization database.

Figure 6:
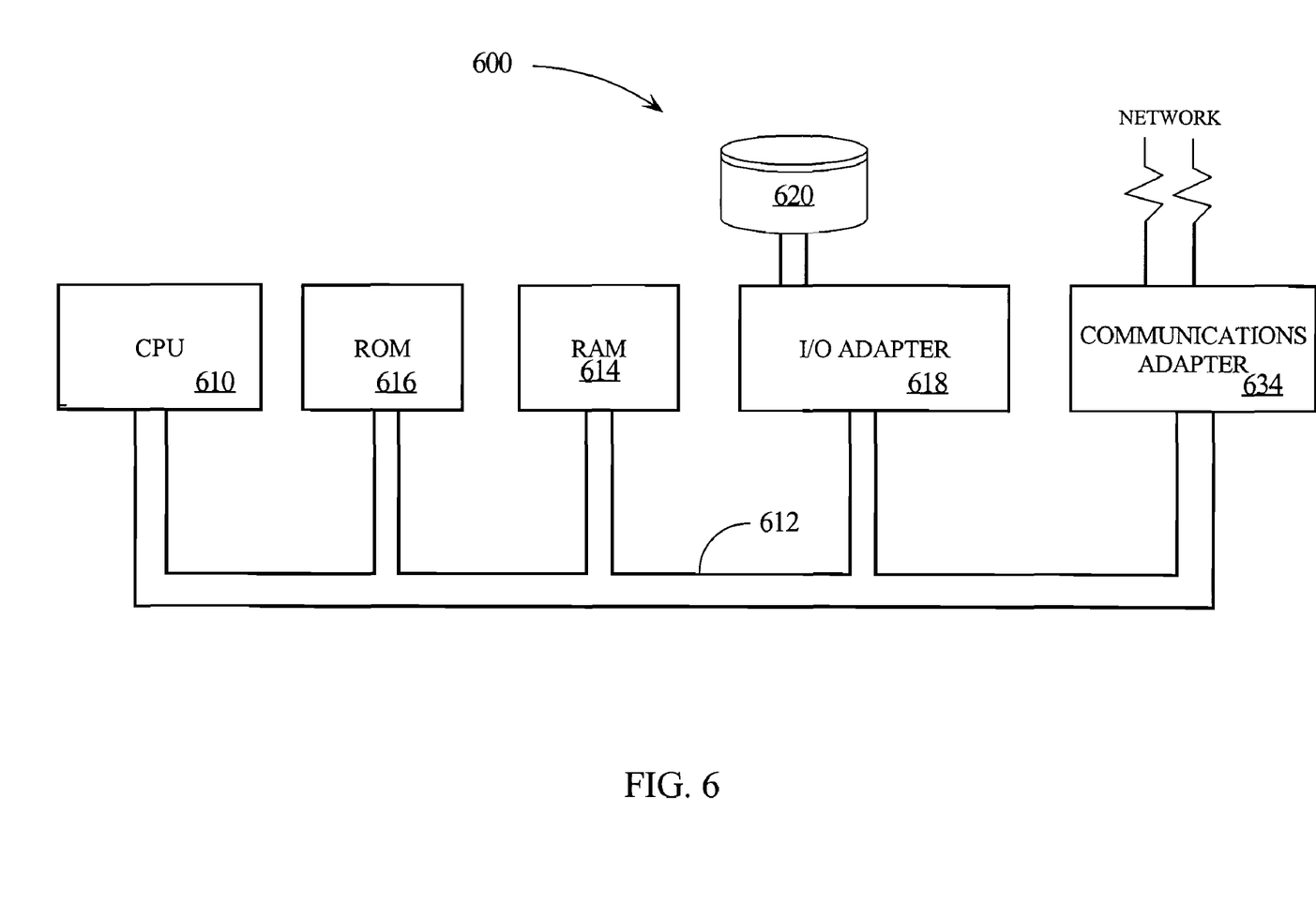
FIG. 6 illustrates, in block diagram form, a data processing system which may be used in conjunction with the methodologies incorporating the present inventive principles.

FIG. 6 illustrates an exemplary hardware configuration of data processing system 600 in accordance with the subject invention. The system in conjunction with the methodologies illustrated in FIGS. 4 and 5 may be used to apply hierarchical interest profiles to Web content retrieval in accordance with the present inventive principles. Data processing system 600 includes central processing unit (CPU) 610, such as a conventional microprocessor, and a number of other units interconnected via system bus 612. Data processing system 600 also includes random access memory (RAM) 614, read only memory (ROM) 616 and input/output (I/O) adapter 618 for connecting peripheral devices such as nonvolatile storage units 620 to bus 612. System 600 also includes communication adapter 634 for connecting data processing system 600 to a data processing network, enabling the system to communicate with other systems. CPU 610 may include other circuitry not shown herein, which will include circuitry commonly found within a microprocessor, e.g. execution units, bus interface units, arithmetic logic units, etc. CPU 610 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 614 of one or more computer systems configured generally as described above. These sets of instructions, in conjunction with system components that execute them may apply hierarchical interest profiles to Web content retrieval as described hereinabove. Until required by the computer system, the set of instructions may be stored as a computer program product in another computer memory, for example, in nonvolatile storage unit 620 (which may include a removable memory such as an optical disk, floppy disk, CD-ROM, or flash memory for eventual use in nonvolatile storage unit 620). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

What is claimed is:

1. A method of delivering at least one webpage by a data processing system, comprising:
   the data processing system receiving search result content from a user-initiated search of web content;
   the data processing system receiving a hierarchical data set of interests identified by a user;
   the data processing system parsing the hierarchical data set;
   the data processing system extracting one or more keyword attribute values from the hierarchical data set in response to the parsing and a pre-selected granularity value;
   after receiving the search result content, the data processing system applying the extracted one or more keyword attribute values to the received search result content in order to filter the received search result content for delivery to the user; and
   the data processing system delivering at least one webpage containing the filtered search result content according to the extracted one or more keyword attribute values for display by a browser of the user.

2. The method of claim 1 wherein the hierarchical data set comprises an XML document.

3. The method of claim 1 further comprising:
   pre-populating a Web content search form page using the extracted one or more keyword attribute values; and
   returning the Web content search form page to the user, wherein the at least one webpage is a customized portal page associated with the user using the hierarchical data set and delivered to the user by a portal server.

4. The method of claim 3, wherein the hierarchical data set is received and imported into a portal database by the portal server and is organized in a tree hierarchy having a plurality of levels, where each level of the tree hierarchy represents a user specific grouping of user interests at a different level of granularity than a granularity level for other of the plurality of levels.

5. The method of claim 4, further comprising:
   the portal server receiving the Web content search form from the user that contains a user-specified granularity level that reflects a depth within a branch of the tree hierarchy that the portal server will apply in responding to the Web content search form page.

6. The method of claim 1 wherein, if no keyword attribute is associated with an interest, using a value attribute of the interest as a default keyword.

7. The method of claim 1 wherein the pre-selected granularity value corresponds to a root-to-leaf level in the hierarchical data set of identified interests.

8. A computer program product embodied in a machine-readable medium for delivering at least one webpage, the computer program produce comprising programming instructions for:
   receiving search result content from a user-initiated search of web content;
   receiving a hierarchical data set of interests identified by a user;
   parsing the hierarchical data set;
   extracting one or more keyword attribute values from the hierarchical data set in response to the parsing and a pre-selected granularity value;
   after receiving the search result content, applying the extracted one or more keyword attribute values to the received search result content in order to filter the received search result content for delivery to the user; and
   delivering at least one webpage containing the filtered search result content according to the extracted one or more keyword attribute values to the user.

9. The computer program product of claim 8 wherein the hierarchical data set comprises an XML document.

10. The computer program product of claim 8 further comprising programming instructions for:
    pre-populating a Web content search form page using the extracted one or more keyword attribute values; and
    returning the Web content search form page to the user, wherein the at least one webpage is a customized portal page associated with the user using the hierarchical data set and delivered to the user by a portal server.

11. The computer program product of claim 10, wherein the hierarchical data set is received and imported into a portal database by the portal server and is organized in a tree hierarchy having a plurality of levels, where each level of the tree hierarchy represents a user specific grouping of user interests at a different level of granularity than a granularity level for other of the plurality of levels.

12. The computer program product of claim 11, further comprising programming instructions for:
    the portal server receiving the Web content search form page from the user that contains a user-specified granularity level that reflects a depth within a branch of the tree hierarchy that the portal server will apply in responding to the Web content search form page.

13. The computer program product of claim 8 wherein, if no keyword attribute is associated with an interest, using a value attribute of the interest as a default keyword.

14. The computer program product of claim 8 wherein the granularity value corresponds to a root-to-leaf level in the hierarchical data set of identified interests.

15. A data processing system for delivering at least one webpage comprising:
    a processor;
    an application program recorded in a computer storage medium and executable by the processor for:
    receiving search result content from a user-initiated search of web content;
    receiving a hierarchical data set of interests identified by a user;
    parsing the hierarchical data set;

extracting one or more keyword attribute values from the hierarchical data set in response to the parsing and a pre-selected granularity value;

after receiving the search result content, applying the extracted one or more keyword attribute values to the received search result content in order to filter the received search result content for delivery to the user; and delivering the at least one webpage containing the filtered search result content according to the extracted one or more keyword attribute values the user.

16. The data processing system of claim 15 wherein the hierarchical data set comprises an XML document.

17. The data processing system of claim 15 further comprising: circuitry operable for pre-populating a Web content search form page using the extracted one or more keyword attribute values; and circuitry operable for returning the Web content search form page to the user, wherein the at least one webpage is a customized portal page associated with the user using the hierarchical data set and delivered to the user by a portal server.

18. The data processing system of claim 17, wherein the hierarchical data set is received and imported into a portal database by the portal server and is organized in a tree hierarchy having a plurality of levels, where each level of the tree hierarchy represents a user specific grouping of user interests at a different level of granularity than a granularity level for other of the plurality of levels.

19. The data processing system of claim 18, further comprising:

circuitry operable for the portal server receiving the Web content search form page from the user that contains a user-specified granularity level that reflects a depth within a branch of the tree hierarchy that the portal server will apply in responding to the Web content search form page.

20. The data processing system of claim 15 wherein, if no keyword attribute is associated with an interest, using a value attribute of the interest as a default keyword.

* * * * *